(12) United States Patent
Kanaka et al.

(10) Patent No.: US 7,087,704 B2
(45) Date of Patent: Aug. 8, 2006

(54) METHOD FOR MANUFACTURING THERMOTROPIC LIQUID-CRYSTALLINE POLYMER

(75) Inventors: Keiichi Kanaka, Fuji (JP); Shinya Yamada, Fuji (JP)

(73) Assignee: Polyplastics Co., Ltd., Tokyo (JP)

( * ) Notice: Subject to any disclaimer, the term of this patent is extended or adjusted under 35 U.S.C. 154(b) by 0 days.

(21) Appl. No.: 11/072,290

(22) Filed: Mar. 7, 2005

(65) Prior Publication Data
US 2005/0215754 A1 Sep. 29, 2005

(30) Foreign Application Priority Data
Mar. 26, 2004 (JP) ............................. 2004-092019

(51) Int. Cl.
*C08G 63/00* (2006.01)

(52) U.S. Cl. ...................... 528/190; 528/180; 528/193; 528/194; 528/207; 528/212; 528/219; 524/740; 524/742

(58) Field of Classification Search ................ 528/180, 528/190, 193, 194, 207, 212, 219; 524/740, 524/742
See application file for complete search history.

(56) References Cited

U.S. PATENT DOCUMENTS 6,716,367 B1 * 4/2004 Kanaka et al. ......... 252/299.01
6,956,072 B1 * 10/2005 Kanaka et al. .............. 524/115

FOREIGN PATENT DOCUMENTS

JP          02153922       6/1990
JP         2002363281    * 12/2002

* cited by examiner

Primary Examiner—Samuel A. Acquah
(74) Attorney, Agent, or Firm—Buchanan Ingersoll PC

(57) ABSTRACT

It is an object of the present invention to manufacture high quality thermotropic liquid-crystalline polymer generating no low boiling gas and inducing no discoloration resulted from thermal degradation at high yield. To manufacture a liquid-crystalline polymer having 50 mol % or larger ratio of constitutive unit introduced from 4-hydroxybenzoic acid, the reaction is conducted under the presence of an acylating agent and of a catalyst quantity of aromatic sulfonic acid.

10 Claims, No Drawings

METHOD FOR MANUFACTURING THERMOTROPIC LIQUID-CRYSTALLINE POLYMER

TECHNICAL FIELD

The present invention relates to a method for manufacturing a high quality thermotropic liquid-crystalline polymer at a high yield.

BACKGROUND ART

Since thermotropic liquid-crystalline polymer uses expensive aromatic monomers as raw material to result in high price of the polymer, cut-down of manufacturing cost thereof becomes an important problem. As one of cut-down manners of manufacturing cost, attainment of high yield of the polymer is considered.

As for technique of attaining high yield of the polymer, there is such manner that, after termination of polymerization reaction, temperature of a reaction pot is raised at discharging the polymer to lower molten viscosity of the polymer. However, the polymer is thermally degraded to lead to discoloration and generation of blackish brown polymer and, when thermal degradation is heavy, gas of low boiling components derived from raw material (such as phenol (PhOH), benzoic acid (BA), 4-hydroxybenzoic acid (HBA) or phenol ester compound thereof (HBA-Ph)) or black speck (substance like carbide, abbreviated to BS) generates to give an adverse effect on product quality. Further, there is such problem that, when gas of low boiling components fills in a reaction pot, discharge becomes unstable to lower collection rate from the reaction pot.

Among low boiling point components, in particular components relating to phenol (PhOH, HBA-Ph) are caused by phenol generating by thermal degradation of 4-hydroxybenzoic acid (HBA) residue that is generally used for thermotropic liquid-crystalline polymer. Especially, when acylation-deacylation is conducted in one pot to perform manufacture, degradation (decarboxylation reaction) from HBA to phenol occurs in no small way from the early stage of polymerization. Accordingly, in a liquid-crystalline polymer in which HBA is the main component, a technique is expected for inhibiting decarboxylation reaction of HBA component during polymerization.

In order to inhibit decarboxylation reaction, a method is proposed (see JP-A-2-153922), in which aromatic diol is acylated followed by reaction with HBA to give oligomer, which is subjected to polycondensation with aromatic dicarboxylic acid. However, it can not be applied to a skeleton in which hydroxycarboxylic acid occupies most part. Further, it cannot be said that inhibition of conversion of HBA into phenol is sufficient. Use of an excess acylating agent to a hydroxyl group or an amino group tends to inhibit decarboxylation reaction. However, by this manner, discoloration of polymer or thickening due to side reaction becomes significant. The present applicant proposed previously a method in which generation of low boiling point gas is inhibited by maintaining a charge amount of a raw monomer, an amount of an acylating agent and an amount of a catalyst in a specified relationship to obtain a high quality polymer without discoloration due to thermal degradation and the like at high yield (see JP-A-2002-363281). However, since the metal salt catalyst used for accelerating acylation, basically, also has an effect of accelerating decarboxylation reaction, the inhibition effect had a limit.

DISCLOSURE OF THE INVENTION

It is a purpose of the invention, by dissolving the aforementioned drawback in conventional technique, to provide a method for manufacturing high quality thermotropic liquid-crystalline polymer without gas generation of a low boiling component and discoloration due to thermal degradation, at high yield.

The present inventors studied hard to achieve the purpose and found as the result that, by conducting reaction under the presence of an acylating agent and a catalyst amount of aromatic sulfonic acid, gas generation of a low boiling point component is inhibited and high quality polymer without discoloration caused by thermal degradation and the like can be discharged from a reaction pot at a high collection ratio, to accomplish the invention.

In other words, the present invention is a method for manufacturing a thermotropic a liquid-crystalline polymer by conducting reaction in the presence of an acylating agent and a catalyst amount of an aromatic sulfonic acid for manufacturing a liquid-crystalline polymer having 50 mol % or larger of constitutive unit introduced from 4-hydroxybenzoic acid.

The invention provides more specifically a method for manufacturing a thermotropic liquid-crystalline polymer having 50 mol % or larger of a constitutive unit introduced from 4-hydroxybenzoic acid and comprising 50 to 90 mol % of a constitutive unit represented by the formula (I) and 10 to 50 mol % of a constitutive unit represented by the formula (II), comprising the step of polymerizing monomers having unit groups represented by the following formulae (I) and (II), respectively, in the presence of an acylating agent and a catalyst quantity of an aromatic sulfonic acid.

The invention provides a preferable embodiment of the above shown method that the polymer further comprises 0 to 10 mol % of a constitutive unit represented by the formula (III) and 0 to 10 mol % of a constitutive unit represented by the formula (IV) and monomers having unit groups represented by the following formulae (III) and (IV), respectively, are further polymerized.

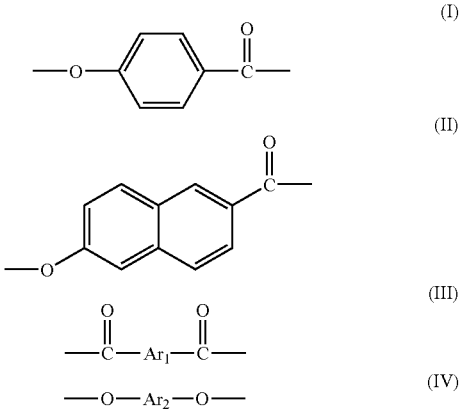

where, each of $Ar_1$ and $Ar_2$ means a divalent group constituted by containing at least one aromatic ring.

DETAILED EXPLANATION OF THE INVENTION

Hereinafter, the invention will be described in detail. A liquid-crystalline polymer to be the object of manufacture in the invention is one having 50 mol % or larger of constitutive unit introduced from 4-hydroxybenzoic acid. Other constitutive units are not particularly limited in so far as the polymer expresses liquid-crystalline properties. The polymer is manufactured by polycondensation of monomers selected from publicly known aromatic hydroxydicarboxylic acid, aromatic diol, aromatic dicarboxylic acid, aromatic hydroxyamine, aromatic aminocarboxylic acid, aromatic diamine and the like. Among them, the polymer that especially exerts the effect is one containing the constitutive units represented by the formulae (I) and (II) as the essential constitutive units and, when desired, further containing the constitutive units represented by the formulae (III) and/or (IV).

In order to realize the aforementioned constitutive units (I) to (IV), various compounds having ordinary ester-forming function are used.

Examples of the aromatic dicarboxylic acid for the constitutive unit (III) include aromatic dicarboxylic acid such as terephthalic acid, 4,4'-diphenyl dicarboxylic acid, 4,3'-diphenyldicarboxylic acid, 4,4"-triphenyldicarboxylic acid, 2,6-naphthalenedicarboxylic acid, 1,4-naphthalenedicarboxylic acid, 2,7-naphthalenedicarboxylic acid, diphenylether-4,4'-dicarboxylic acid, diphenoxyethane-4,4'-dicarboxylic acid, diphenoxybutane-4,4'-dicarboxylic acid, diphenylethane-4,4'-dicarboxylic acid and isophthalic acid; halogen-substitution products of the aforementioned aromatic dicarboxylic acid such as chloroterephthalic acid, dichloroterephthalic acid and bromoterephthalic acid; alkyl-substitution products of the aforementioned aromatic dicarboxylic acid such as methylterephthalic acid, dimethylterephthalic acid and ethylterephthalic acid; and alkoxy-substitution products of the aforementioned aromatic dicarboxylic acid such as methoxyterephthalic acid and ethoxyterephthalic acid.

The constitutive unit (IV) is an aromatic diol, including aromatic diol such as hydroquinone, resorcin, 4,4'-dihydroxydiphenyl, 4,4"-dihydroxytriphenyl, 2,6-naphthalenediol, 4,4'-dihydroxydiphenylether, bis(4-hydroxyphenoxy) ethane, 3,3'-dihydroxydiphenyl, 4,3'-dihydroxydiphenyl, 3,3'-dihydroxydiphenylether, 2,2-bis(4-hydroxyphenyl)propane, 2,2-bis(4-hydroxyphenyl)methane; and alkyl-, alkoxy- or halogen-substitution products of the aforementioned aromatic diol such as chlorohydroquinone, methylhydroquinone, phenylhydroquinone, methoxyhydroquinone, 4-chlororesorcin and 4-methylresorcin.

In the invention, it is preferable that the polymer contains the aforementioned constitutive units (I) to (IV), wherein the constitutive unit (I) is from 50 to 90 mol %, the constitutive unit (II) is from 10 to 50 mol %, the constitutive unit (III) is from 0 to 10 mol %, and the constitutive unit (IV) is from 0 to 10 mol %, to the total constitutive units.

The liquid-crystalline polymer of the invention is manufactured by polymerizing the aforementioned raw monomers by employing the aforementioned catalyst under the existence of an acylating agent. As for an acylating agent for use in the invention, aliphatic or aromatic carboxylic acid anhydride can be mentioned, including preferably a lower aliphatic carboxylic acid anhydride having 10 or less carbons such as acetic anhydride and propionic anhydride, and especially preferably acetic anhydride. Regarding an acylating agent to be used, use of an excess quantity is desirable to quantity of functional groups to be acetylated, in order to complete surely the reaction. However, as described above, since presence of a too excess acylating agent may lead to discoloration of the polymer and significant thickening due to side reaction, it is desirable to use it in excess by 1 to 8 mol % to the total mol number of function groups to be acetylated.

Examples of the aromatic sulfonic acid as a catalyst for use in the invention include benzenesulfonic acid, p-toluene sulfonic acid, p-xylene-2-sulfonic acid, m-xylene-4-sulfonic acid, naphthalene-1-sulfonic acid, naphthalene-2-sulfonic acid and p-chlorosulfonic acid. p-toluene sulfonic acid is preferable. The aromatic sulfonic acid catalyst is generally used in a quantity from 5 to 500 ppm, preferably from 10 to 300 ppm on the basis of weight per theoretical quantity of the polymer.

In the invention, a metal compound may be present as a catalyst in addition to an aromatic sulfonic acid. Any compound that is generally used in polycondensation reaction may be used as the metal compound, but rare-earth metal compound is preferable. Especially preferable is lanthanum compound, and any of carboxylate, oxide, hydroxide, carbonate, complex salt, and a mixture thereof may be usable. The metal compound catalyst is generally used in a quantity from 2 to 200 ppm, preferably from 10 to 150 ppm on the basis of metal weight per theoretical quantity of the polymer.

When the invention is practiced, polymerization reaction is generally initiated by charging raw monomers, an acylating agent and a catalyst in a reactor at the same time. On this occasion, a part of acylatedmonomer maybe contained previously. The charged raw monomer is acylated in the system under heating to produce an acylated reaction product, which is further subjected to ester exchange with carcoxylic acid, while separating an organic acid produced as a by-product, to progress polycondensation. The reaction is maintained until a targeted polymer viscosity is achieved. Here, the acylation reaction and the polycondensation reaction may be conducted in one reactor, or in an acylation reactor and a polycondensation reactor separately.

Acylation proceeds at a temperature in the range from 100 to 200° C. When the acylation is conducted with acetic anhydride witch is used especially preferably, it is desirable to reflux acetic anhydride in order to prevent loss of it through evaporation.

Polycondensation reaction of the acylated product proceeds at 210° C. or higher. Along with rise of reaction temperature, an organic acid produced as a by-product is removed, gradually the degree of polymerization rises, and eventually it is heated up to around 300 to 400° C. Although the final polymerization temperature varies depending on respective polymers, it is preferably set at a temperature higher than the melting point of the polymer to be generated by 0 to 50° C. By reducing pressure in the system to remove volatile components in the last place, it is possible to further progress conversion into a higher molecular weight and to inhibit blowout of volatile gas at discharge. For the treatment under a reduced pressure, a reduced pressure lever is employed in the range from 133 Pa to ordinary pressure.

After polymerization, molten polymer is discharged from a reactor through an extrusion orifice provided with a die in an arbitrary shape to perform cooling and collection. Generally, molten product is discharged through a die provided with a hole to form strand, which is drawn into a water bath, formed in to pellets and dried.

The liquid-crystalline polymer manufactured by the method of the invention has a molten viscosity of 100000 Pa·s or less preferably, and 1000 Pa·s or less more preferably at a shear rate of 1000/sec at a temperature higher than the melting point by 10 to 30° C., when melt molding processability thereof is taken into account. Such degree of molten viscosity can be attained sufficiently only by melt polymerization. But, in some cases, it is also possible to intend increase in molecular weight by preparing prepolymer having melt viscosity of several Pa·s at the stage of melt polymerization, followed by polymerizing the prepolymer in solid-phase at a temperature lower than the melting point thereof, preferably at a temperature lower than the melting point by 20 to 80° C. The solid-phase polymerization can be conducted by any method of batch-, semi-batch- or continuous-type. The reaction system is operated preferably under a reduced pressure or under flow of an inert gas such as nitrogen.

In the method of the invention for manufacturing liquid-crystalline polymer, polymerization may also be conducted while adding a stabilizer, a colorant, filler or the like, as in publicly known technique, in a range that does not harm or lower the effect of the invention. Examples of such filler include silica, powder quartz, sand, fumed silica, silicon carbide, aluminum oxide, glass fiber, and a mixture of these.

The melt-anisotropic property of the liquid-crystalline polymer obtained according to the invention can be confirmed by a polarized test method in common use utilizing orthogonal polarizers. More specifically, confirmation of the melt-anisotropic property can be practiced by melting a sample placed on a hot stage produced by Linkam and observing the sample in a nitrogen atmosphere at a magnification of 150 times by use of a polarizing microscope of OLYMPUS CORPORATION. The above polymer is optically anisotropic and allows light to transmit the polymer when inserted between the orthogonal polarizers. When the sample is optically anisotropic, light transmits the sample even when the sample is in a state of a molten, static fluid.

The liquid-crystalline polymer obtained according to the invention may be compounded with various additives such as various fibrous, particulate and tabular inorganic and organic fillers and antioxidants corresponding to intended use, and also converted into a resin composition added supplementarily with another thermoplastic resin in a range that does not harm the intended purpose of the invention.

EXAMPLES

Hereinafter, the invention will be described specifically based on Examples, but the invention shall not be limited thereto.

Example 1

226.37g (73 mol %) of 4-hydroxybenzoic acid, 114.07g (27 mol %) of 6-hydroxy-2-naphthoic acid, 233.78g (1.02 times hydroxyl equivalent) of acetic anhydride and 22.5 mg (75 ppm to resin to be generated) of p-toluene sulfonic acid as a catalyst were charged in a polymerization vessel provided with a stirrer having a torque meter, a reflux column, a nitrogen introduction tube and a condenser.

After substituting inside of the system with nitrogen, the temperature was raised to 140° C. to conduct acetylation for 1 hour. Subsequently, the temperature was raised by 1° C. per minute up to 325° C., while evaporating and removing acetic acid produced as a by-product, followed by reducing the pressure to 10 Torr (1334 Pa) over 15 minutes to conduct polycondensation while evaporating excess acetic acid. After the torque of the stirrer reached the predefined value (4.5 kg·cm), nitrogen was introduced to discharge the polymer from the under side of the polymerization vessel under increased pressure. Yield of the polymer was 89%.

Kind and amount of gases generated from the obtained polymer were analyzed by using Curie point headspace/gas chromatograph, while heating at 320° C. for 10 minutes. The result is listed in Table 1.

Examples 2 and 3

Polymerization was conducted in the same way as Example 1 by using the volume of acetic anhydride and p-toluene sulfonic acid as listed in Table 1. Yield and amount of generated gases are listed in Table 1.

Example 4

Polymerization was conducted in the same way as Example 1 by using 236.08 g (1.03 times hydroxyl equivalent) of acetic anhydride, 30.0 mg (100 ppm to resin to be generated) of p-toluene sulfonic acid as a catalyst and 7.5 mg (21.3 weight ppm in terms of metallic lanthanum to resin to be generated) of lanthanum oxide. Yield and amount of generated gases are listed in Table 1.

Comparative Example 1

Polymerization was conducted in the same way as Example 1 by using 22.5 mg (30 weight ppm in terms of metallic potassium to resin to be generated) of potassium acetate as a catalyst. Yield and amount of generated gases are listed in Table 1.

Example 5

259.70 g (80 mol %) of 4-hydroxybenzoic acid, 59.71 g (13.5 mol %) of 6-hydroxy-2-naphthoic acid, 25.38 g (6.5 mol %) of terephthalic acid, 233.31 g (1.04 times hydroxyl equivalent) of acetic anhydride and 22.5 mg (75 ppm to resin to be generated) of p-toluene sulfonic acid as a catalyst were charged in the polymerization vessel used in Example 1.

After substituting inside of the system with nitrogen, the temperature was raised to 140° C. to conduct acetylation for 1 hour. Subsequently, the temperature was risen by 0.6 to 1° C. per minute up to 340 ° C., while evaporating and removing acetic acid produced as a by-product, followed by reducing the pressure to 10 Torr (1334 Pa) over 15 minutes to conduct polycondensation while evaporating excess acetic acid. After a laps of 30 minutes from the arrival of the pressure at 10 Torr, nitrogen was introduced to discharge the oligomer from the under side of the polymerization vessel under increased pressure. Yield and amount of generated gases are listed in Table 1.

Comparative Example 2

Polymerization was conducted in the same way as Example 5 by using 22.5 mg (30 weight ppm in terms of metallic potassium to resin to be generated) of potassium acetate as a catalyst. Yield and amount of generated gases are listed in Table 1.

Example 6

252.99 g (80 mol %) of 4-hydroxybenzoic acid, 58.17 g (13.5 mol %) of 6-hydroxy-2-naphthoic acid, 27.71 g (6.5 mol %) of 4,4'-dihydroxydiphenyl, 258.89 g (1.04 times hydroxyl equivalent) of acetic anhydride and 22.5 mg (75 ppm to resin to be generated) of p-toluene sulfonic acid as a catalyst were charged in the polymerization vessel used in Example 1. Polycondensation was conducted in the same operation as Example 5 and, finally, the oligomer was discharged from the under side of the polymerization vessel under increased pressure. Yield and amount of generated gases are listed in Table 1.

Comparative Example 3

Polymerization was conducted in the same way as Example 6 by using 22.5 mg (30 weight ppm in terms of metallic potassium to resin to be generated) of potassium acetate as a catalyst. Yield and amount of generated gases are listed in Table 1.

Example 7

1660.08 g (73 mol %) of 4-hydroxybenzoic acid, 836.54 g (27 mol %) of 6-hydroxy-2-naphthoic acid, 1731.22 g (1.03 times hydroxyl equivalent) of acetic anhydride and 330 mg (75 ppm to resin to be generated) of p-toluene sulfonic acid as a catalyst were charged in the polymerization vessel used in Example 1 to conduct polycondensation in the same operation as Example 1. Yield was 91%. 70 weight % of obtained thermotropic liquid-crystalline polymer and 30 weight % of glass fiber were compounded and kneaded with a twin-screw extruder to give pellets of the thermotropic liquid-crystalline polymer composition. Amount of gases generated from the liquid-crystalline polymer composition pellet is listed in Table 1.

Comparative Example 4

Polymerization was conducted in the same way as Example 7 by using 1714.41 g (1.02 times hydroxyl equivalent) of acetic anhydride and 165 mg (30 weight ppm in terms of metallic potassium to resin to be generated) of potassium acetate as a catalyst. Yield was 87%. Subsequently, pellets of the thermotropic liquid-crystalline polymer composition were obtained similar to Example 7 to evaluate amount of generated gases. The result is listed in Table 1.

In this connection, respective abbreviated codes of raw materials in Table 1 mean the following:
HBA: 4-hydroxybenzoic acid
HNA: 6-hydroxy-2-naphthoic acid
TA: terephthalic acid
BP: 4,4'-dihydroxydiphenyl
PTSA: p-toluene sulfonic acid
La$_2$O$_3$: lanthanum oxide
KOAc: potassium acetate
PhOH: phenol
HBA-Ph: 4-hydroxybenzoic acid phenolester compound

The invention claimed is:

1. A method for manufacturing a thermotropic liquid-crystalline polymer having 50 mol % or larger of a constitutive unit introduced from 4-hydroxybenzoic acid and comprising 50 to 90 mol % of a constitutive unit represented by the formula (I) and 10 to 50 mol % of a constitutive unit represented by the formula (II), comprising the step of polymerizing monomers having unit groups represented by the following formulae (I) and (II), respectively, in the presence of an acylating agent and a catalytic quantity of an aromatic sulfonic acid:

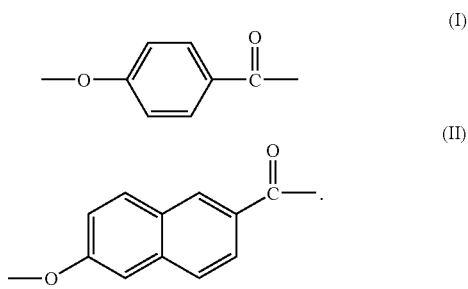

2. The method according to claim 1, in which the polymer further comprises 0 to 10 mol % of a constitutive unit represented by the formula (III) and 0 to 10 mol % of a constitutive unit represented by the formula (IV) and monomers having unit groups represented by the following formulae (III) and (IV), respectively, are further polymerized:

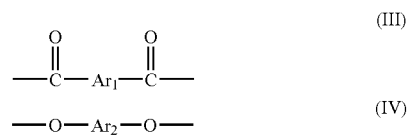

where, each of Ar$_1$ and Ar$_2$ means a divalent group containing at least one aromatic ring.

3. The method according to claim 1, wherein the aromatic sulfonic acid is p-toluenesulfonic acid.

TABLE 1

| | HBA (g) | HNA (g) | TA (g) | BP (g) | Acetic anhydride (g) | Catalyst pTSA (mg) | Catalyst La$_2$O$_3$ (mg) | Catalyst KOAc (mg) | Yield (%) | Generated gases (ppm) PhOH | Generated gases (ppm) HBA-Ph |
|---|---|---|---|---|---|---|---|---|---|---|---|
| Ex. 1 | 226.37 | 114.07 | | | 233.78 | 22.5 | | | 89 | 83 | 8 |
| Ex. 2 | 226.37 | 114.07 | | | 238.37 | 22.5 | | | 90 | 33 | 4 |
| Ex. 3 | 226.37 | 114.07 | | | 233.78 | 67.5 | | | 89 | 42 | 9 |
| Ex. 4 | 226.37 | 114.07 | | | 236.08 | 30.0 | 7.5 | | 91 | 204 | 30 |
| Com. Ex. 1 | 226.37 | 114.07 | | | 236.08 | | | 22.5 | 85 | 369 | 395 |
| Ex. 5 | 259.70 | 59.71 | 25.38 | | 233.31 | 22.5 | | | 98 | 40 | 8 |
| Com. Ex. 2 | 259.70 | 59.71 | 25.38 | | 233.31 | | | 22.5 | 97 | 259 | 203 |
| Ex. 6 | 252.99 | 58.17 | | 27.71 | 258.89 | 22.5 | | | 99 | 35 | 7 |
| Com. Ex. 3 | 252.99 | 58.17 | | 27.71 | 258.89 | | | 22.5 | 98 | 191 | 256 |
| Ex. 7 | 1660.08 | 836.54 | | | 1731.22 | 330.0 | | | 91 | 129 | 37 |
| Com. Ex. 4 | 1660.08 | 836.54 | | | 1714.41 | | | 165.0 | 87 | 590 | 264 |

4. The method according to claim 1, in which the reaction is carried out in the presence of a catalytic quantity of a metal compound.

5. The method according to claim 4, wherein the metal compound is a rare-earth metal compound.

6. The method according to claim 1, in which the reaction is initiated by charging a reaction with the whole raw material monomer, the acylating agent and the catalyst.

7. A method for manufacturing a thermotropic liquid-crystalline polymer, comprising the step of solid-phase polymerizing a prepolymer product obtained by the method according to claim 1 to increase the degree of polymerization.

8. The method according to claim 2, wherein the aromatic sulfonic acid is p-toluenesulfonic acid.

9. The method according to claim 2, in which the reaction is initiated by charging a reaction with the whole raw material monomer, the acylating agent and the catalyst.

10. A method for manufacturing a thermotropic liquid-crystalline polymer, comprising the step of solid-phase polymerizing a prepolymer product obtained by the method according to claim 2 to increase the degree of polymerization.

* * * * *